United States Patent
LePage (10) Patent No.: US 12,391,303 B2
(45) Date of Patent: Aug. 19, 2025

(54) INTERFACE FOR EPS SERVO UNIT

(71) Applicant: Robert Bosch GmbH, Stuttgart (DE)

(72) Inventor: Gabriel LePage, Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 752 days.

(21) Appl. No.: 17/696,770

(22) Filed: Mar. 16, 2022

(65) Prior Publication Data
US 2023/0294756 A1  Sep. 21, 2023

(51) Int. Cl.
*B62D 5/04* (2006.01)
*B62D 3/12* (2006.01)

(52) U.S. Cl.
CPC .............. *B62D 5/0424* (2013.01); *B62D 3/12* (2013.01)

(58) Field of Classification Search
CPC ....... B62D 5/0421; B62D 5/0424; B62D 3/12
See application file for complete search history.

(56) References Cited

U.S. PATENT DOCUMENTS

| | | | |
|---|---|---|---|
| 5,213,173 A | 5/1993 | Konishi et al. | |
| 5,836,419 A | 11/1998 | Shimizu et al. | |
| 6,805,017 B2 * | 10/2004 | Chikaraishi | B62D 5/0409 |
| | | | 180/443 |
| 7,413,051 B2 * | 8/2008 | Okada | B62D 5/0424 |
| | | | 180/444 |
| 7,591,204 B2 | 9/2009 | Ueno et al. | |
| 7,822,520 B2 * | 10/2010 | Takeuchi | B62D 5/0463 |
| | | | 701/41 |
| 8,360,910 B2 | 1/2013 | Leutner | |
| 8,950,543 B2 | 2/2015 | Heo et al. | |
| 9,802,641 B2 | 10/2017 | Tomikawa | |
| 9,933,050 B2 | 4/2018 | Yamamoto | |
| 2005/0247514 A1 * | 11/2005 | Heitzer | F16H 7/14 |
| | | | 180/444 |

FOREIGN PATENT DOCUMENTS

EP  1266817 A2 *  12/2002  ........... B62D 5/0424

OTHER PUBLICATIONS

Bosch, "Electric Power Steering Belt Drive Servo Unit", Product Information, 2021, 8 pages.
Bosch, "Electric Power Steering (EPS) Servolectric", Product Information, 2019, 2 pages.
Bosch, "Servolectric", 2015, Product Information, 18 pages.

* cited by examiner

*Primary Examiner* — Jacob D Knutson
(74) *Attorney, Agent, or Firm* — Michael Best & Friedrich LLP (57) ABSTRACT

An electric power steering system includes an electric motor, a steering rack drivable along a steering rack axis with power from the electric motor, and a mechanical coupling between the electric motor and the steering rack for transmitting power from the electric motor to the steering rack. The mechanical coupling is enclosed within a housing. A compression fitting interface couples the electric motor and the housing.

18 Claims, 8 Drawing Sheets

INTERFACE FOR EPS SERVO UNIT

BACKGROUND

Figure 1:
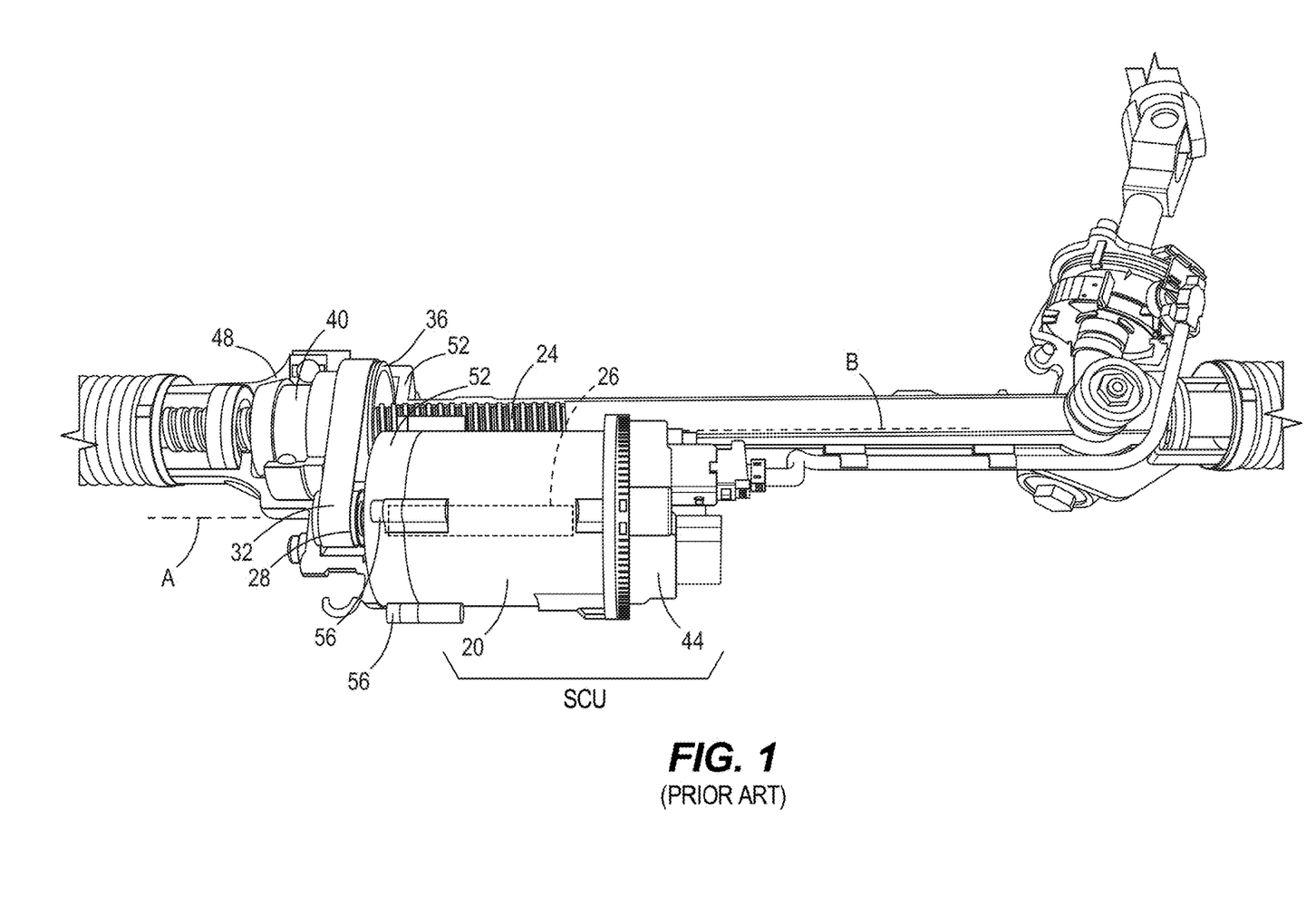
FIG. 1 is a partial cutaway of an electric power steering system according to the prior art.

The present invention relates to electric power steering systems (EPS). EPS has begun to dominate many sectors of vehicles as a more efficient replacement for conventional hydraulic-assisted power steering. In some forms, an electric motor is placed alongside the steering rack and controlled to provide steering assistance, or automated steering response to turn the vehicle's front wheels. The electric motor can have an output shaft provided with a toothed disc thereon for driving the steering rack through a flexible belt. Such products are known in the art, including those from Robert Bosch Automotive Steering and designated in the market as Servolectric®. One such example is shown in FIG. 1 where the electric motor 20 is arranged with an axis A parallel to an axis B of the steering rack 24. The electric motor 20 output shaft supports a toothed disc 28 meshed with a flexible belt 32 to drive a secondary toothed disc 36 for rotating a ball recirculating nut 40 to assist in driving movement of the steering rack 24 along the axis B. This type of mechanical coupling between the electric motor 20 and the steering rack 24 is used in what is referred to as an "axial parallel actuation" EPS construction. The motor 20 can be provided with an integrated electronic control unit 44 to form a so-called steering control unit (SCU). Between the SCU and the gearbox cover 48 that encloses the ball recirculating nut 40 and a portion of the steering rack 24, an intermediate housing 52 is provided. The intermediate housing 52, which is partially cutaway in FIG. 1 encloses the flexible belt 32 and the toothed discs 28, 36. The SCU is mated with the intermediate housing 52 by a plurality of threaded fasteners 56 that extend parallel to the axis A of the electric motor 20. Tension in the flexible belt 32 is lost if the SCU is removed, since the toothed disc 28 is supported against the belt tension by the output shaft of the electric motor 20.

Figure 2:
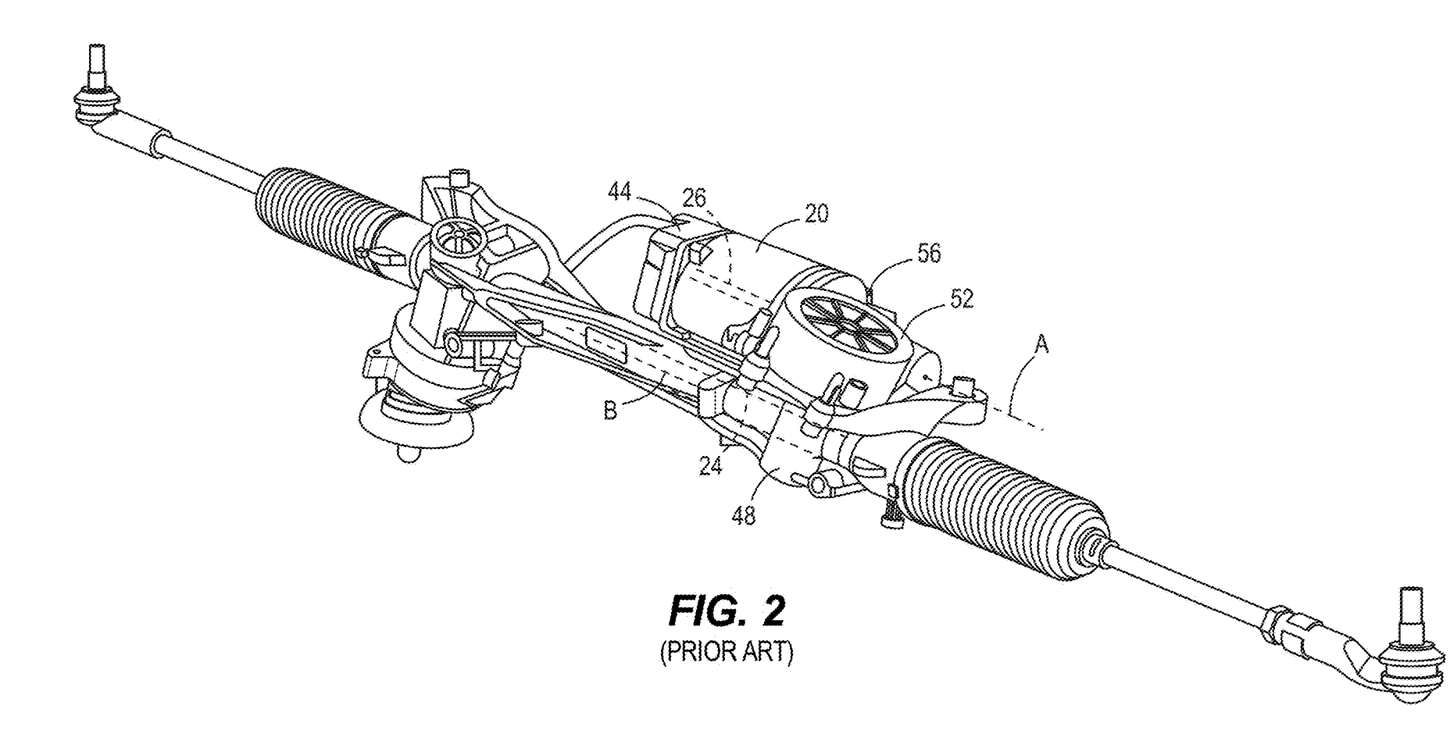
FIG. 2 illustrates another electric power steering system according to the prior art.
Figure 3:
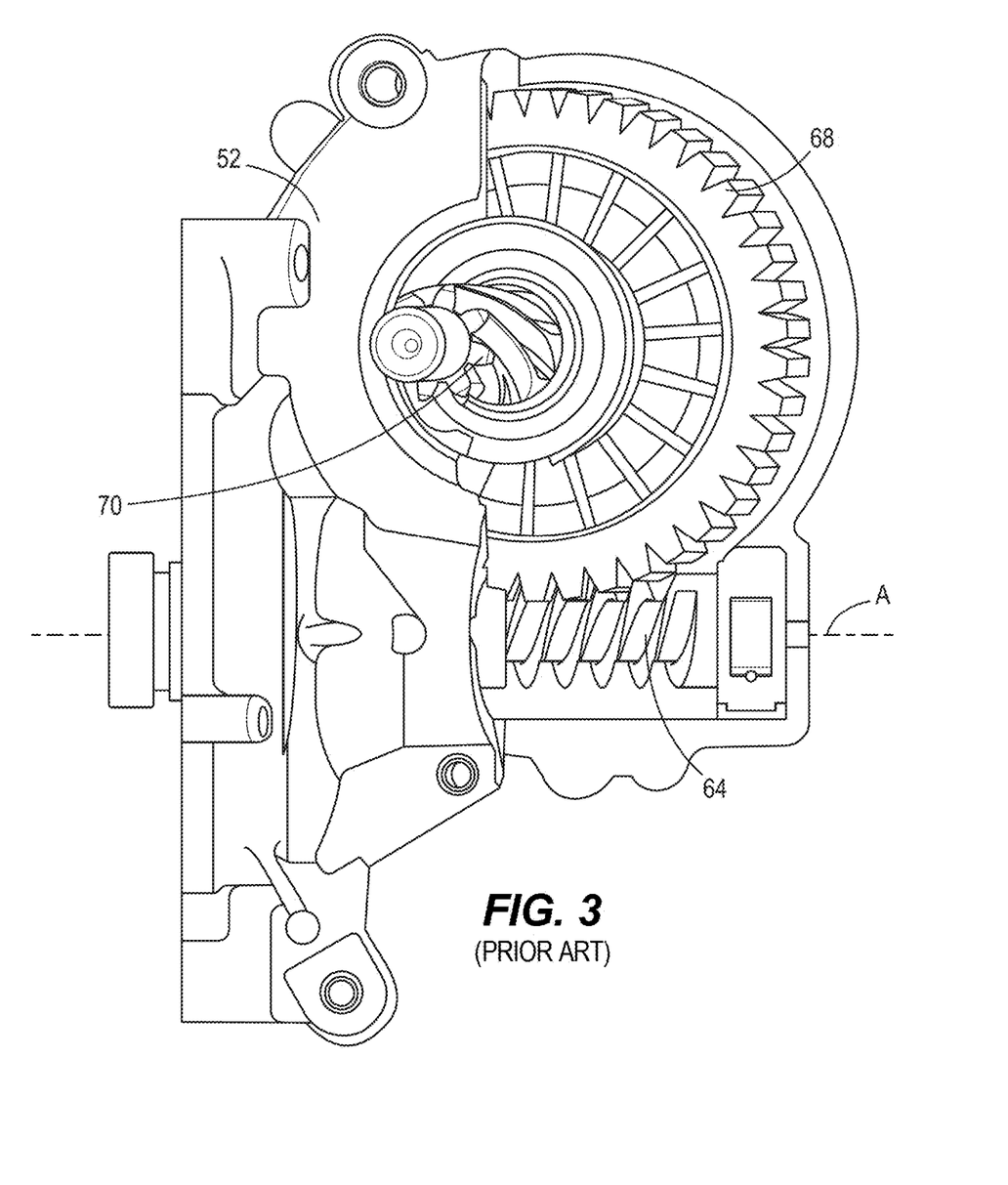
FIG. 3 is a partial cutaway of the electric power steering system of FIG. 2.

FIGS. 2 and 3 illustrate another type of EPS system, which is similar in many respects to that of FIG. 1. Similar parts are labeled with consistent reference numerals. Although the motor 20 is oriented with its axis A parallel to the steering rack axis B like in FIG. 1, the EPS system of FIGS. 2 and 3 actuates the steering rack 24 in a different way. Rather than a flexible belt spanning a pair of toothed discs, FIG. 3 illustrates a worm 64 extending from the output shaft 26 of the motor 20, with the worm 64 configured to drive a helical gear 68, which in turn is configured to drive rotation of a drive pinion 70 meshed with the teeth of the steering rack 24. This type of mechanical coupling between the electric motor 20 and the steering rack 24 is used in what is referred to as a "dual pinion" EPS construction, as the drive pinion 70 provides a secondary pinion on the steering rack 24 spaced a distance from the primary pinion from the steering shaft.

SUMMARY

In one aspect, the invention provides an electric power steering system including an electric motor, a steering rack drivable along a steering rack axis with power from the electric motor, and a mechanical coupling between the electric motor and the steering rack for transmitting power from the electric motor to the steering rack. The mechanical coupling is enclosed within a housing. A compression fitting interface couples the electric motor and the housing.

In another aspect, the invention provides an electric power steering system including an electric motor having an output shaft, and a steering rack drivable along a steering rack axis with power from the electric motor. A belt is coupled between the electric motor and the steering rack for transmitting power of the electric motor to the steering rack, and the belt is enclosed within a belt housing and stretched to an operating belt tension by a first tooth disc and a second tooth disc. A boltless mounting interface secures the electric motor and the belt housing. The output shaft is axially releasable from the first toothed disc, the first toothed disc being supported in the belt housing to maintain the operating belt tension regardless of whether the electric motor is coupled to the housing.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 4-7 illustrate an electric power steering (EPS) system 100 according to an embodiment of the present disclosure. The EPS system 100 can share some basic structure with the conventional EPS system shown in FIGS. 2 and 3 and briefly described above. For brevity, the figures and description are focused on aspects of the EPS system 100 which differ from the prior art, with the understanding that the components shown in FIGS. 4-7 can be used as replacements for components of the preceding figures and description. For example, FIGS. 4-7 do not illustrate a steering rack since it will be understood that the EPS system 100 can operate with a steering rack 24 as shown in FIGS. 1-3 and described above. For convenience, reference numbers used in FIGS. 4-7 are kept the same or incremented from "xx" to "lxx" compared to the preceding figures and description, as appropriate. The EPS system 100 includes an electric motor 120 placed alongside the steering rack 24 and controlled to provide steering assistance, or automated steering response to turn the vehicle's front wheels. The electric motor 120 has an output shaft 126 rotatable about an axis A. The axis A of the electric motor 120 is parallel to the axis B along which the steering rack 24 reciprocates. Reference is made directly to FIG. 2, where the electric motor 120 can be provided in the position of the electric motor 20. The EPS system 100 can be a so-called "dual pinion" system in which a worm 64 extends from the output shaft 126 of the motor 120, with the worm 64 configured to drive the helical gear 68, which in turn is configured to drive rotation of the drive pinion 70 meshed with the teeth of the steering rack 24. Other mechanical couplings are optional, one of which is described further below with reference to FIG. 11.

The mechanical coupling for the dual pinion EPS system 100 is enclosed within a housing 152. The housing 152 is similar to the housing 52 of FIGS. 2 and 3 in that it is an intermediate housing situated between the electric motor 120 and the gearbox cover 48 which receives the steering rack 24. Within the housing 152, a pair of bearings 172 support the worm 64 at opposite axial ends thereof. Mechanical coupling between the motor output shaft 126 and the worm 64 is provided by a collar 176, which can be for example a hollow ring with internal splines for engaging complementary splines formed on the adjacent end portions of the motor output shaft 126 and the worm 64. The adjacent splined end portions of the motor output shaft 126 and the worm 64 are both received into the collar 176 such that the collar 176 couples the motor output shaft 126 and the worm 64 for co-rotation when the motor 120 is operated.

The electric motor 120 can be provided with an integrated electronic control unit 144 to form a so-called steering control unit (SCU) or servo unit. The electronic control unit 144 can be supported directly by the electric motor 120, rather than remotely mounted at another position within the vehicle. For example, the electronic control unit 144 can be positioned at an axial end of the electric motor 120 which is opposite the end where the output shaft 126 extends into the housing 152. In other constructions, the electronic control unit 144 may be supported at different positions on the exterior of the electric motor 120. The electronic control unit 144 contains at least one processor configured to calculate a control signal for driving the electric motor 120 to provide steering assistance when the vehicle steering wheel and steering shaft are rotated by input from a driver within the vehicle. In some constructions, the processor of the electronic control unit 144 is configured to calculate a control signal for driving the electric motor 120 to provide autonomous steering control, without input from driver within the vehicle. Steering assist and autonomous steering can be provided in different switchable modes of the vehicle, or the vehicle may be configured with only one or the other. One or more electrical connectors 146 are provided on the electronic control unit 144 and used to mate with electrical connectors of various electrical cables or wires, e.g., power to the motor 120, signal output from a steering torque sensor, feedback to a main vehicle ECU, etc. The electric motor 120 is positioned with respect to the steering rack 24 so that the electrical connector(s) 146 are accessible for connection and disconnection, at the time of original vehicle assembly and/or field service.

Especially in vehicles designated for extended lifetime service (e.g., commercial transport, delivery, etc.), there may be an eventual need for servicing the EPS system 100, including removal/replacement of the electric motor 120, (e.g., along with the integrated electronic control unit 144). There is also the need to secure the electric motor 120 and the housing 152 by way of a solid and sealed connection therebetween. Conventional EPS systems rely on a plurality of bolts around a perimeter of the electric motor where it mates axially to a flange of the housing, and a seal may be compressed when the bolts are tightened. To the contrary, the EPS system 100 of the present disclosure is designed to include a boltless mounting interface between the electric motor 120 and the housing 152. In particular, a compression fitting interface 180 is provided to couple the electric motor 120 and the housing 152. In some constructions, the housing 152 and the electric motor 120 are axially coupled exclusively by the compression fitting interface 180. As such, an axial end of the electric motor 120 is joined with a complementary portion of the housing 152, without an axially interposed seal. Rather, sealing is accomplished between the outer periphery of the motor 120 and a receiving portion (or "flange") 184 of the housing 152 that lies radially outside the motor 120.

Figure 4:
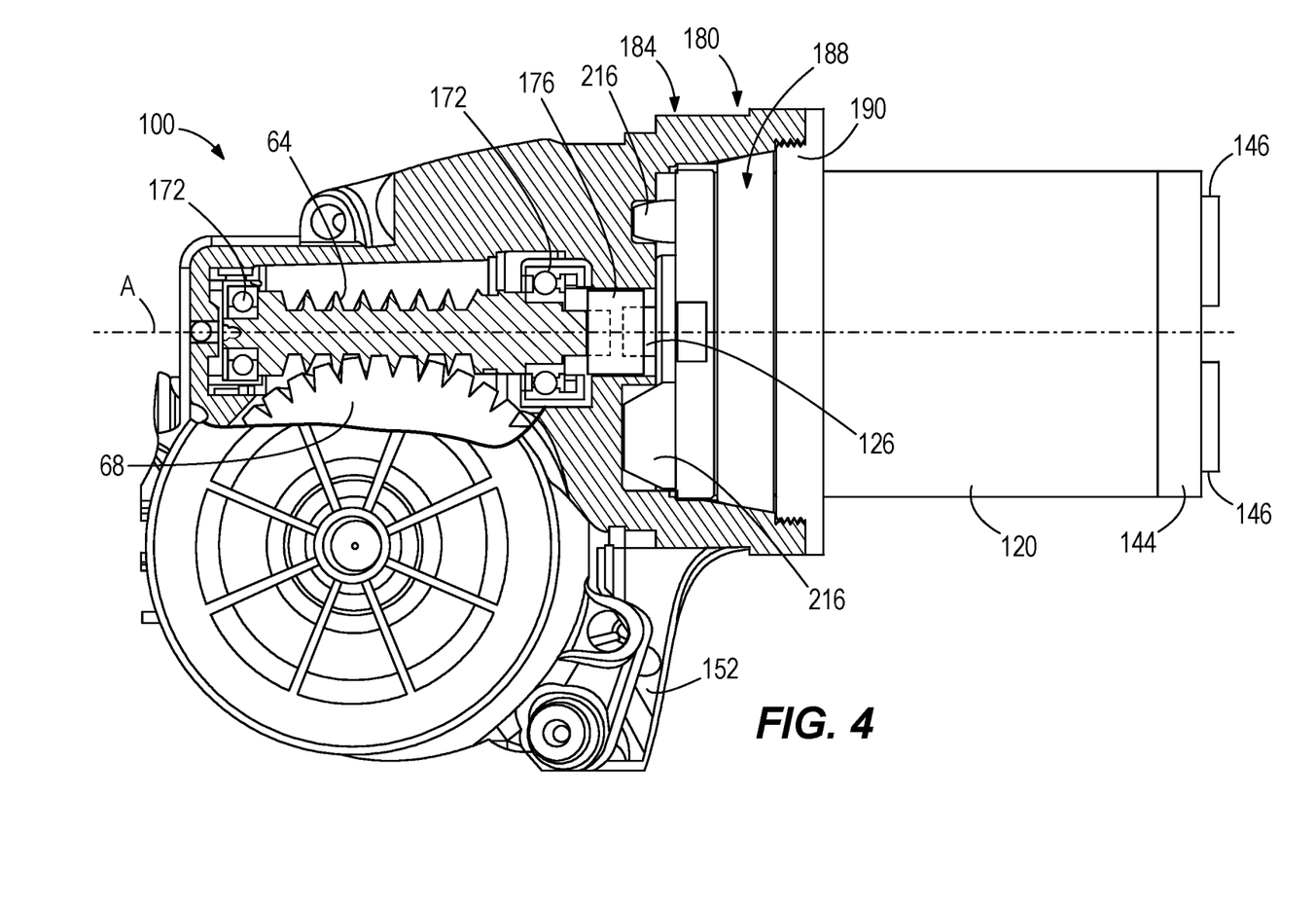
FIG. 4 is a partial cutaway of an electric power steering system according to one embodiment of the present disclosure in which power is conveyed to the steering rack via a pinion.
Figure 5:
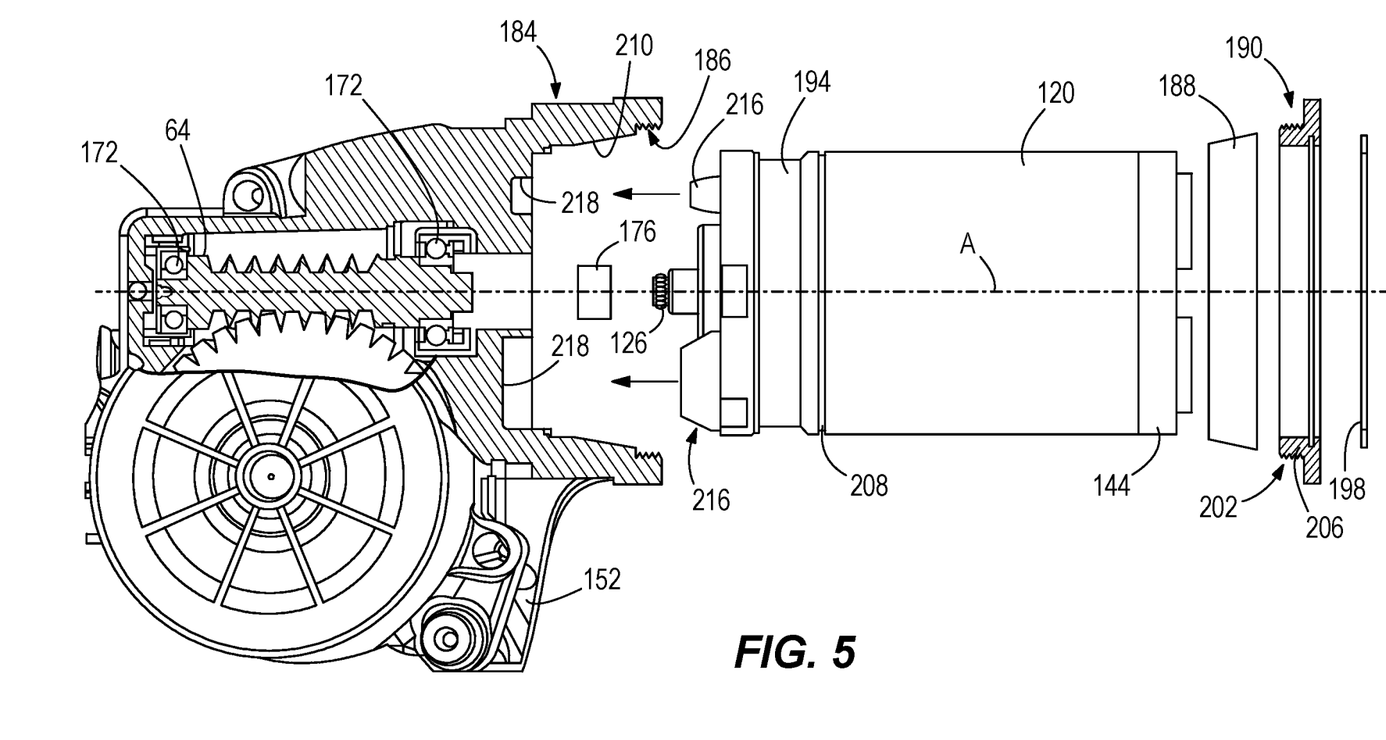
FIG. 5 is a partially exploded assembly view of the electric power steering system of FIG. 4.

The flange 184 of the housing 152 makes up one portion of the compression fitting interface 180, the parts of which can be observed in greater detail in the exploded assembly view of FIG. 5. The flange 184 can be integrally formed (e.g., cast) as part of the housing 152, and includes a threaded portion 186 that extends around or circumscribes the electric motor 120 adjacent the output or shaft end thereof. The compression fitting interface 180 further includes a compression seal 188 and a threaded compression screw plug 190. The compression seal 188 is positioned radially between the electric motor 120 and the housing flange 184, and the compression seal 188 is seated within a groove 194 formed in the outer surface of the electric motor 120. The compression seal 188 may be configured to have an elastic fit around the outside of the electric motor 120. The compression screw plug 190 is axially locked to the electric motor 120 by a retention or locking member 198 (e.g., retaining clip, snap ring), and the compression screw plug 190 is threaded to the housing flange 184 to both establish a connection therebetween and to tighten the compression seal 188. As can be appreciated from FIGS. 4 and 5, the compression screw plug 190 can have external threads 202 engageable with the internally threaded portion 186 of the flange 184. However, it is also conceived to reverse the threads on these parts. The locking member 198 is illustrated as a snap ring, an outside of which is received within a groove 206 on the inside of the compression screw plug 190 and an inside of which is received within a groove 208 on the outside of the electric motor 120. Due to the engagements provided by the locking member 198, increasing the threaded engagement between the compression screw plug 190 and the housing flange 184 by tightening the compression screw plug 190 pulls the electric motor 120 into the housing 152 along the axis A.

Figure 6:
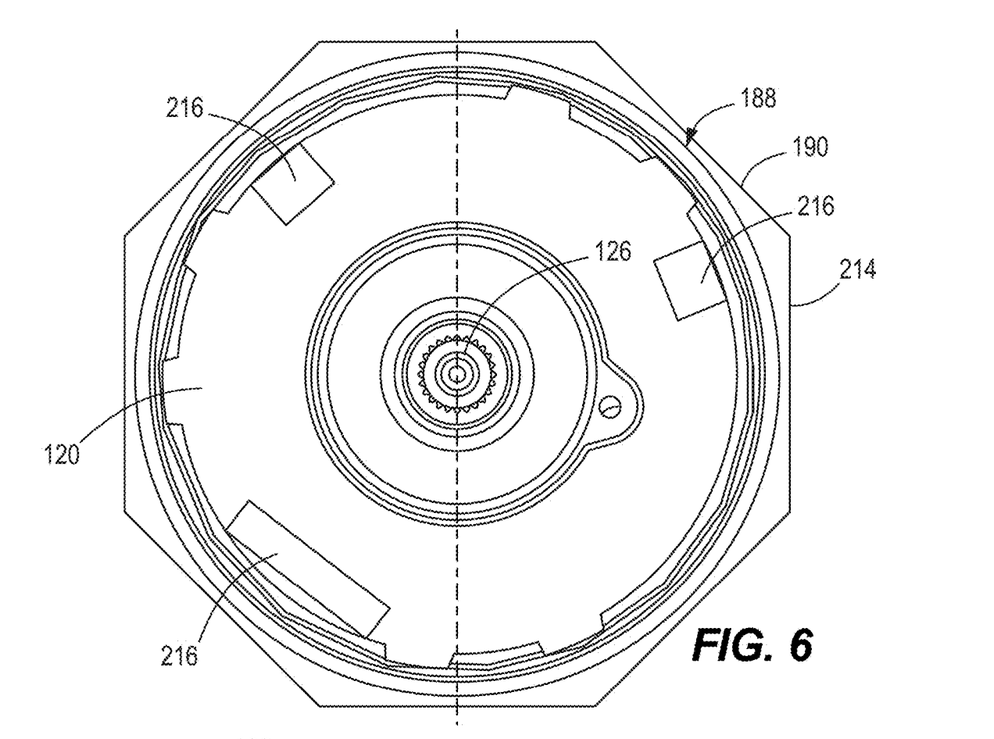
FIG. 6 is an end view of portions of the electric power steering system of FIGS. 4 and 5, including an electric motor, a compression seal, and a compression screw plug.

The tightening the compression screw plug 190 causes a wedge action between the compression seal 188 and an interior seal surface 210 of the housing 152. The radially outer surface of the compression seal 188 can have a frustoconical shape following a revolved line segment that forms an acute angle with the central axis A. The interior seal surface 210 can be substantially complementary such that the seal connection becomes increasingly tighter as the compression screw plug 190 is tightened into the housing 152. The compression screw plug 190 can be provided with a portion that axially abuts an enlarged end of the compression seal 188. As shown in FIG. 6, the exterior profile of the compression screw plug 190 can be provided with a plurality of wrench flats 214 (e.g., an eight-sided profile) for tightening and loosening operations to be performed by a tool (e.g., wrench, not shown) applied generally perpendicular to the axis A. As will be understood by one of ordinary skill in the art, such a tool operates about the axis A with leverage away from the axis A.

With a single threaded joint about the central axis A, as opposed to an array of axial fasteners coupling the electric motor 120 and the housing 152 about a prescribed bolt pattern, the compression fitting interface 180 does not control or set a prescribed orientation of the motor 120 about the axis A in relation to the housing 152 and thus the steering rack 24. However, controlling this orientation or "clocking" of the motor 120 can be desirable in some constructions. For example, it may be desirable or necessary to clock the motor 120 in a prescribed rotational orientation so as to present the electrical connector(s) 146 into a position that enables a connection and/or enables access for field service. In conjunction with the compression fitting interface 180, which is situated around the motor 120, an anti-rotation interface is separately formed between the axial end of the motor 120 and the interior of the housing 152. In particular, the anti-rotation interface includes complementary shapes in an arrangement that renders the electric motor 120 capable of being assembled in a single predefined orientation with respect to the housing 152 in a so-called "poka-yoke." As shown in FIGS. 4-6, the motor 120 can include a number of studs or male projections 216 (e.g., a plurality of different size and/or shape) and the housing interior can include a number of recesses or female receptacles 218 corresponding to the male projections 216. Without the prescribed orientation, the projections 216 and the receptacles 218 do not mate, and assembly of the compression screw plug 190 is prevented. The projections 216 and the receptacles 218 can be provided in a regular or irregular array when viewed along the axis A, and one exemplary array pattern is shown in the axial end view of the motor 120 presented in FIG. 6.

Figure 7:
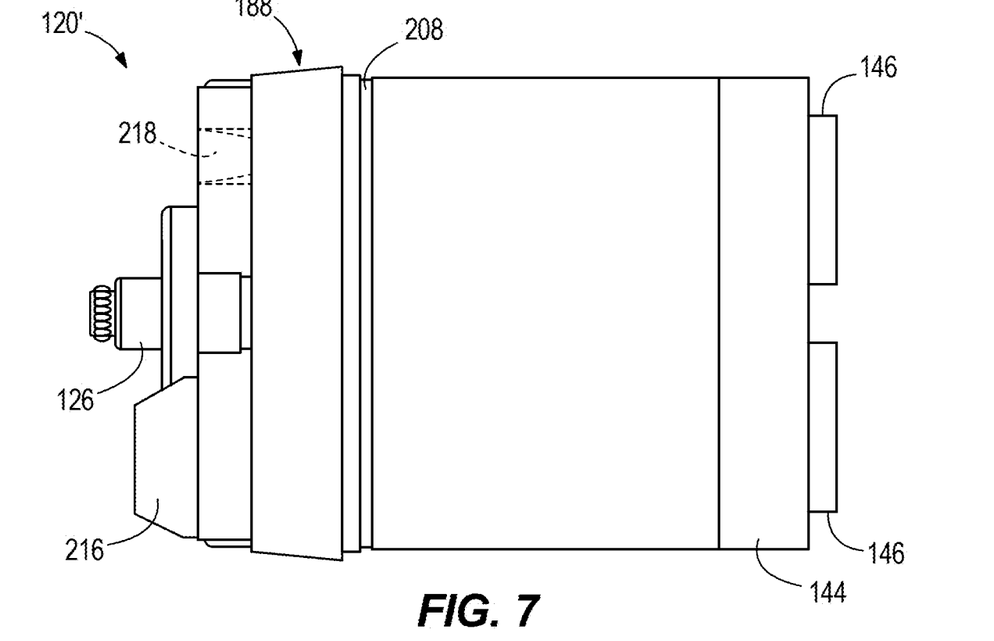
FIG. 7 is a front view of an alternate electric motor having an axial end interface different from that shown in FIGS. 4 and 5.

FIG. 7 illustrates an alternate embodiment in which the axial end of the motor 120' includes at least one projection 216 and at least one receptacle 218. Although not shown, it will be understood that the illustrated motor 120' is configured for use with an alternate housing, the interior of which also includes at least one projection and at least one receptacle for complementing the structures provided on the end of the motor 120'. In yet other embodiments, the motor can have just one or more receptacles, without any projections, and the mating housing interior can have just one or more projections. In some constructions, a series of motors can be manufactured with varying axial end configurations (e.g., anti-rotation interface) corresponding to differences between the motors, and in some cases directly linked to compatibility between the motors and different steering racks and/or different mechanical couplings to the steering rack. In this way, the various motors are mechanically "coded" to be capable of assembly with only the prescribed downstream mechanism. FIG. 7 illustrates for example that the motor 120' can be of a different class than the motor 120 as observed here by its shorter axial length. The two motors 120, 120' may be physically interchangeable aside from the different axial end interfaces, such that the difference in axial end interfaces avoids the possibility that one is accidentally assembled with a steering rack for a vehicle in which is not suitable as determined by the manufacturer, and which may lead to poor performance or inoperability.

Figure 8:
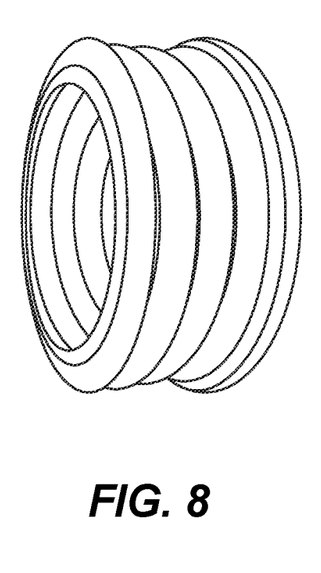
FIG. 8 is a detail view of a first exemplary ribbed compression seal.
Figure 9:
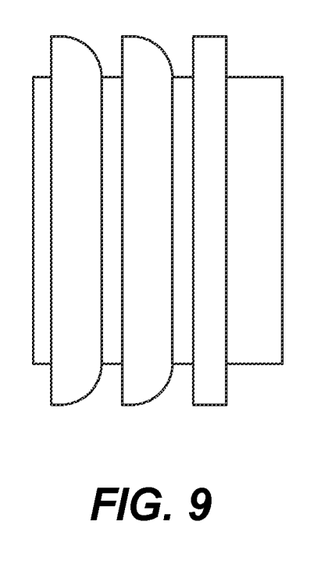
FIG. 9 is a detail view of a second exemplary ribbed compression seal.
Figure 10:
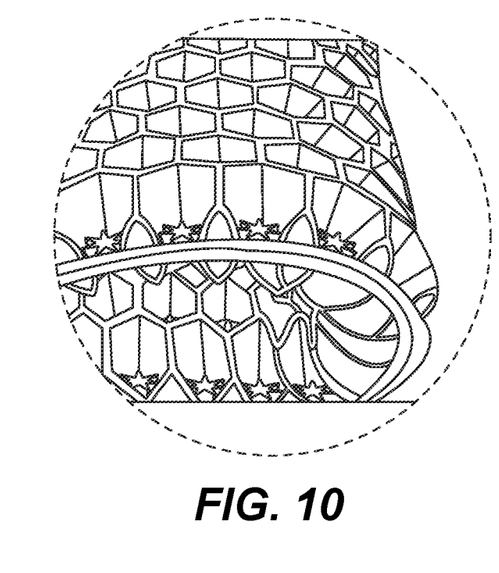
FIG. 10 is a detail view of an exemplary honeycomb compression seal surface.

FIGS. 8-10 illustrate a few different embodiments for enhancing the sealing structure at the compression fitting interface 180. In general, these features can be provided in the compression seal 188, but may alternately be provided in the interior seal surface 210 of the housing 152. FIGS. 8 and 9 illustrate exemplary ribbing whereby multiple separate seals can be formed in series along the axial direction of the compression seal 188. FIG. 10 illustrates an exemplary honeycomb seal surface in which multiple walls are provided in a polygonal pattern. These are some examples of providing redundant seals. However, in addition or in lieu of these examples, sealing redundancy can be provided by one or more beads of sealant (e.g., RTV silicone sealant) applied along the compression fitting interface 180.

Figure 11:
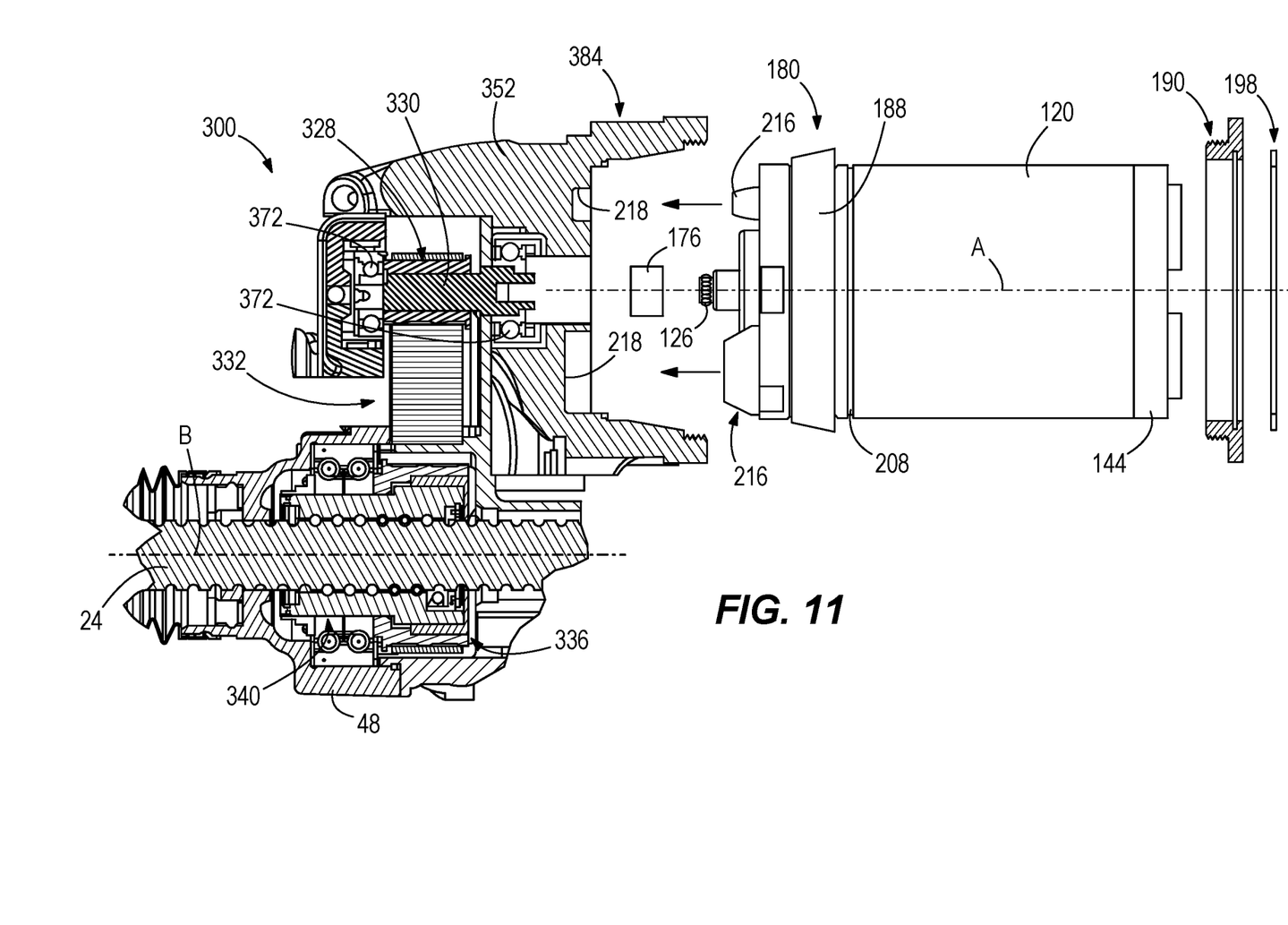
FIG. 11 is a partially exploded assembly view of an electric power steering system according to another embodiment of the present disclosure in which power is conveyed to the steering rack via a belt.

FIG. 11 is a partially exploded assembly view of an EPS system 300 according to another embodiment. For the sake of simplicity, the EPS system 300 is shown with the same SCU as the preceding embodiment although it will be understood that the structure of the motor 120 and/or the electronic control unit 144 can take a variety of forms. Similar parts are labeled with consistent reference numerals. In the embodiment of FIG. 11, the mechanical coupling between the electric motor 120 and the steering rack 24 includes a belt drive like that of FIGS. 2 and 3. The mechanism includes a toothed disc 328 meshed with a flexible belt 332 to drive a secondary toothed disc 336 for rotating the ball recirculating nut 340 to drive axial movement of the steering rack 24 along the axis B. In other words, the EPS system 300 is of the axial parallel actuation type. The toothed disc 328 is pressed onto an intermediate shaft 330 that is positioned along the axis A of the motor output shaft 126, but separate therefrom. The motor output shaft 126 and the intermediate shaft 330 can be locked for co-rotation by the collar 176. The intermediate housing 352 is provided between the SCU and the gearbox cover 48 that encloses the ball recirculating nut 340 and a portion of the steering rack 24. The intermediate housing 352, which is partially cutaway in FIG. 11 encloses the flexible belt 332 and the toothed discs 328, 336. Within the housing 352, a pair of bearings 372 support the intermediate shaft 330 at opposite axial ends thereof. The SCU is mated with the intermediate housing 352 by the compression fitting interface 180 including the compression seal 188, the compression seal plug 190, and a housing flange 384 like the flange 184 of the housing 152 described above. Thus, the motor 120 (and SCU overall) is releasably secured and sealed without the use of threaded fasteners that extend parallel to the axis A of the electric motor 120. The operating tension in the flexible belt 332 is retained even when the SCU is removed (e.g., for service or replacement), since the toothed disc 328 remains in place, fully supported by the intermediate shaft 330 and in turn by the intermediate housing 352 through the bearings 372. The intermediate shaft 330 can be eccentrically mounted within the housing 352 to adjust tension in the belt 332. In other constructions, a separate belt tensioner can be provided in the intermediate housing 352 between the toothed discs 328, 336.

In some constructions, the EPS systems 100, 300 can be provided in a heavy duty vehicle engineered for an extended service life as compared to a regular passenger vehicle, and the EPS systems 100, 300 are intended to be serviceable by replacement of the SCU. Such a replacement service can be carried out with the EPS systems 100, 300 otherwise fully installed in the vehicle. In addition to not requiring belt tensioning as part of the SCU replacement service (which in and of itself reduces time and cost associated with the service for an axial parallel actuation system using a belt), the SCU can be removed from the housing 152 or 352 by loosening a single joint or fastener that extends around or circumscribes the output end of the electric motor 120. A required tool can be brought into an operational configuration with the joint by movement in a direction perpendicular to the motor axis A and can operate at just one side of the motor 120, eliminating the need to access multiple fastener positions and eliminating the need to manipulate a tool oriented parallel to the motor axis A.

Although the invention has been described in detail with reference to certain preferred embodiments, variations and modifications exist within the scope and spirit of one or more independent aspects of the invention as described.

What is claimed is:

1. An electric power steering system comprising:
    an electric motor;
    a steering rack drivable along a steering rack axis with power from the electric motor;
    a mechanical coupling between the electric motor and the steering rack for transmitting power from the electric motor to the steering rack, wherein the mechanical coupling is enclosed within a housing; and
    a compression fitting interface coupling the electric motor and the housing, the compression fitting interface disposed adjacent an axial end of the electric motor at which the mechanical coupling is provided.

2. The electric power steering system of claim 1, wherein the mechanical coupling includes a first toothed disc drivable from an output shaft of the electric motor, a flexible belt drivable from the first toothed disc, and a second toothed disc drivable from the flexible belt.

3. The electric power steering system of claim 2, wherein the output shaft is axially releasable from the first toothed disc, the first toothed disc being supported in the housing to maintain tension in the flexible belt regardless of whether the electric motor is coupled to the housing.

4. The electric power steering system of claim 1, wherein the axial end of the electric motor mates axially to a complementary portion of the housing without an axially interposed seal.

5. The electric power steering system of claim 1, wherein the compression fitting interface includes
    a compression seal positioned radially between the electric motor and a flange of the housing, and
    a compression screw plug axially locked to the electric motor and threaded to the housing flange to axially compress the compression seal.

6. The electric power steering system of claim 5, wherein the compression screw plug is axially locked to the electric motor by a lock ring seated into a groove formed in the electric motor.

7. The electric power steering system of claim 5, wherein the compression seal is seated within a groove in an outer surface of the electric motor.

8. The electric power steering system of claim 1, wherein the housing and the electric motor are axially coupled exclusively by the compression fitting interface.

9. The electric power steering system of claim 1, wherein an anti-rotation interface is formed separately from the compression fitting interface between the axial end of the electric motor and an interior of the housing.

10. The electric power steering system of claim 9, wherein the anti-rotation interface includes complementary shapes in an arrangement that renders the electric motor capable of being assembled in a single predefined orientation with respect to the housing.

11. The electric power steering system of claim 1, wherein the mechanical coupling includes a worm drivable from the electric motor, a helical gear wheel drivable from the worm, and a drive pinion drivable from the helical gear wheel to drive the steering rack.

12. An electric power steering system comprising:
    an electric motor having an output shaft;
    a steering rack drivable along a steering rack axis with power from the electric motor;
    a belt coupled between the electric motor and the steering rack for transmitting power of the electric motor to the steering rack, wherein the belt is enclosed within a belt housing and stretched to an operating belt tension by a first tooth disc and a second tooth disc; and
    a boltless mounting interface securing the electric motor and the belt housing, the boltless mounting interface comprising a compression interface, the compression interface further including a compression seal positioned radially between the electric motor and a flange of the housing and a compression screw plug axially locked to the electric motor and threaded to the housing flange to axially compress the compression seal,
    wherein the output shaft is axially releasable from the first toothed disc, the first toothed disc being supported in the belt housing to maintain the operating belt tension regardless of whether the electric motor is coupled to the housing.

13. The electric power steering system of claim 12, wherein the compression screw plug is axially locked to the electric motor by a lock ring seated into a groove formed in the electric motor.

14. The electric power steering system of claim 12, wherein the housing and the electric motor are axially coupled exclusively by the compression fitting interface.

15. The electric power steering system of claim 12, wherein the compression seal is seated within a groove in an outer surface of the electric motor.

16. The electric power steering system of claim 12, wherein an axial end of the electric motor mates axially to a complementary portion of the housing without an axially interposed seal.

17. The electric power steering system of claim 12, wherein an anti-rotation interface is formed between an axial end of the electric motor and an interior of the housing.

18. The electric power steering system of claim 17, wherein the anti-rotation interface includes complementary shapes in an arrangement that renders the electric motor capable of being assembled in a single predefined orientation with respect to the housing.

* * * * *